United States Patent
Hanson, Jr.

(10) Patent No.: US 11,821,150 B2
(45) Date of Patent: *Nov. 21, 2023

(54) COOLING INFILL FOR SYNTHETIC TURF APPLICATIONS

(71) Applicant: GUARDIAN INNOVATIONS, LLC, Peachtree Corners, GA (US)

(72) Inventor: Wallace Lee Hanson, Jr., Peachtree Corners, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/059,047

(22) Filed: Nov. 28, 2022

(65) Prior Publication Data
US 2023/0125084 A1    Apr. 27, 2023

Related U.S. Application Data

(60) Continuation of application No. 16/806,334, filed on Mar. 2, 2020, now Pat. No. 11,512,438, which is a
(Continued)

(51) Int. Cl.
| | |
|---|---|
| *E01C 13/08* | (2006.01) |
| *C08J 9/16* | (2006.01) |
| *C09C 1/36* | (2006.01) |
| *C09C 1/02* | (2006.01) |
| *C08J 9/04* | (2006.01) |

(Continued)

(52) U.S. Cl.
CPC .......... *E01C 13/08* (2013.01); *C08J 9/0023* (2013.01); *C08J 9/0066* (2013.01); *C08J 9/0095* (2013.01); *C08J 9/04* (2013.01); *C09C 1/021* (2013.01); *C09C 1/025* (2013.01); *C09C 1/027* (2013.01); *C09C 1/3607* (2013.01); *D06M 15/248* (2013.01); *C01P 2006/90* (2013.01); *C08J 2201/03* (2013.01); *C08J 2327/06* (2013.01);
(Continued)

(58) Field of Classification Search
CPC ....... E01C 13/08; C08J 9/0023; C08J 9/0066; C08J 9/0095; C08J 9/04; C08J 2201/03; C08J 2327/06; C09C 1/021; C09C 1/025; C09C 1/027; C09C 1/3607; D06M 15/248; C01P 2006/09; C08K 2003/2241; C08K 2003/3045

See application file for complete search history.

(56) References Cited

U.S. PATENT DOCUMENTS

| | | | | |
|---|---|---|---|---|
| 5,135,813 | A * | 8/1992 | Ingle | C09D 5/34 428/424.7 |
| 2005/0123744 | A1* | 6/2005 | Mohanty | B32B 27/22 264/638 |
| 2014/0235769 | A1* | 8/2014 | Mundra | C08J 3/203 524/109 |

* cited by examiner

*Primary Examiner* — K. Boyle
(74) *Attorney, Agent, or Firm* — BakerHostetler

(57) ABSTRACT

Disclosed is an infill for an artificial turf field, the infill comprising: from about 40 wt. % to about 60 wt. % of a polyvinyl chloride resin; from about 5 wt. % to about 30 wt. % of a plasticizer derived from a naturally occurring source; from about 2 wt. % to about 10 wt. % of a reflective pigment; from about 0.01 wt. % to about 0.1 wt. % of a blowing agent; and from about 5 wt. % to about 30 wt. % of a filler. The infill is pelletized and maintains the temperature of an artificial turf field, when disposed throughout the artificial turf field, at a temperature about 15° F. to about 25° F. less than a temperature of a comparative artificial turf under substantially similar ambient and environmental conditions, wherein a comparative infill of the comparative artificial turf consists essentially of crumbed rubber infill.

16 Claims, 1 Drawing Sheet

Related U.S. Application Data division of application No. 15/436,463, filed on Feb. 17, 2017, now abandoned.

(60) Provisional application No. 62/296,379, filed on Feb. 17, 2016.

(51) Int. Cl.
  *D06M 15/248* (2006.01)
  *C08J 9/00* (2006.01)
  *C08K 3/22* (2006.01)
  *C08K 3/30* (2006.01)

(52) U.S. Cl.
  CPC ............... *C08K 2003/2241* (2013.01); *C08K 2003/3045* (2013.01)

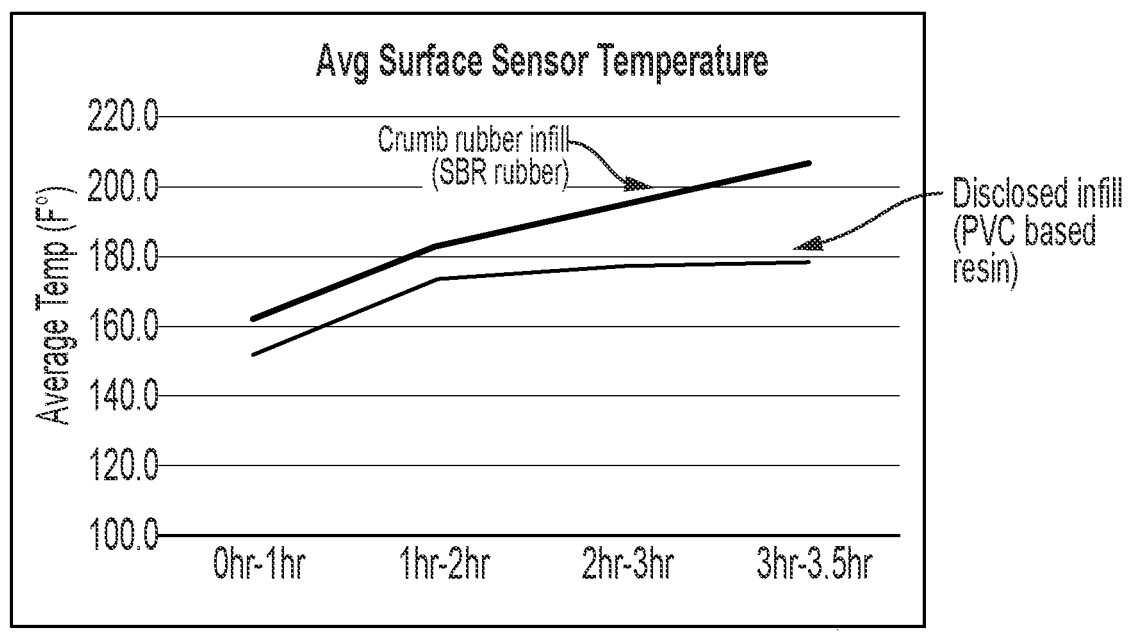

COOLING INFILL FOR SYNTHETIC TURF APPLICATIONS

CROSS REFERENCE TO RELATED APPLICATIONS

This application is a continuation of U.S. application Ser. No. 16/806,334, filed Mar. 2, 2020, which is a divisional of U.S. application Ser. No. 15/436,463 "Cooling Infill for Synthetic Turf Applications," filed Feb. 17, 2017, which claims to the benefit of U.S. application 62/296,379, "Cooling Infill for Synthetic Turf Applications," filed Feb. 17, 2016, the entireties of which are incorporated herein by reference.

TECHNICAL FIELD

The present disclosure relates to the field of materials that can be used to make infill for synthetic turf fields. More specifically, the present disclosure describes materials and processes to make infill that keeps synthetic turf fields cooler and improve dimensional and surface properties of the field.

BACKGROUND

Synthetic or artificial turf fields have long been developed to avoid the costs associated with maintaining natural grass athletic playing areas and to improve upon the durability of the playing surfaces. These synthetic turfs or artificial turfs are typically characterized as grass-like, man-made surfaces prepared using synthetic or non-naturally occurring materials. While these turfs have been used in improving athletic play areas such as sporting arenas, they have also been useful in residential, commercial and industrial properties. Synthetic or artificial turfs are often used in recreational areas and common areas for multiunit dwellings. Artificial turfs or synthetic turfs, particularly for playing surfaces, commonly include a grass-like fiber that is tufted into a woven material and coupled to a resinous backing to keep the grass-like fibers in place. A granular, particulate, or pelletized filling agent may be disposed adjacent the fibers as an infill intended to orient the fibers upright and provide a level of shock absorbency in the synthetic turf field.

Despite the realized advantages of the synthetic turf fields over natural grass fields, conventional synthetic fields including infill may raise their own unique concerns. Conventional infill, especially infill that has been manufactured using crumb rubber, may cause in higher field surface temperatures (e.g., about 15° F. to 40° F. higher than a natural grass turf at similar ambient and environmental conditions). Crumb rubber infill also raises concerns with respect to possible leaching of toxins into surrounding areas. Thus, there remains a need in the art for improved infill compositions that maintain field coolness and enhance field performance.

SUMMARY

Aspects of the present disclosure concern a composition comprising: a polyvinyl chloride resin; a plasticizer; a reflective pigment; a blowing agent; and a filler having a specific graving of greater than 2, wherein a sheet formed from the composition has a low Shore A hardness when tested using a Shore A durometer; wherein a pelletized form of the composition has a specific gravity greater than 1, and wherein the composition has a melting point greater than 200° F.

Other aspects may concern an infill formed from a composition, the composition comprising: from about 40 wt. % to about 60 wt. % of a polyvinyl chloride resin; from about 5 wt. % to about 30 wt. % of a plasticizer; from about 2 wt. % to about 10 wt. % of a reflective pigment; from about 0.01 wt. % to about 0.1 wt. % of a blowing agent; and from about 5 wt. % to about 30 wt. % of a filler, wherein the filler has a specific gravity of greater than 2, wherein a sheet formed from the composition has a Shore A hardness between 50 A and 100 A when tested using a Shore A durometer, wherein the composition has a melting point greater than 200° F., and wherein the infill comprises the composition in pellet form and wherein the pellet form of the infill comprising the composition exhibit a specific gravity greater than 1.

Yet further aspects may concern, a method of forming a composition comprising: combining: from about 40 wt. % to about 60 wt. % of a polyvinyl chloride resin; from about 5 wt. % to about 30 wt. % of a plasticizer; from about 2 wt. % to about 10 wt. % of a reflective pigment; from about 0.01 wt. % to about 0.1 wt. % of a blowing agent; and from about 5 wt. % to about 30 wt. % of a filler, wherein the filler has a specific gravity between 2 and 4, at a temperature and for a time sufficient to form a blended composition, wherein a sheet formed from the blended composition has a Shore A hardness between 50 A and 100 A when tested using a Shore A durometer, wherein a pelletized form of blended composition has a specific gravity greater than 1, and wherein the blended composition has a melting point greater than 200° F.

BRIEF DESCRIPTION OF THE DRAWINGS

FIG. 1 provides a graphical representation of the temperature differences for synthetic turf carpet systems differing by the type of infill.

DETAILED DESCRIPTION OF ILLUSTRATIVE EMBODIMENTS

The present disclosure can be understood more readily by reference to the following detailed description of the disclosure and the Examples included therein.

Synthetic or artificial turf fields may include a grass-like fiber (e.g., polyethylene) that may be lubricated and tufted into a woven backing material. The rear of the backing material may be coated with a polyurethane or latex backing medium to secure the tufts in to place and improve moisture resistance of the woven backing. The turf may be filled with an infill (e.g., disposing an infill material adjacent the fibers) that orients the fibers upright and provides shock absorption. In some applications of the turf, it is also interspersed with short, curly, spring-like fibers that keep the blades upright. Sometimes a top-dressing or a ballast can be used to keep the infill in place. This top-dressing may comprise a silica sand or acrylic coated sand. As described herein, the infill may be dispersed throughout the fibers of the synthetic turf field, or, the infill may be described as dispersed or disposed throughout the synthetic turf field. Synthetic turf surfaces have been widely desired for their durability and lower maintenance costs, but are most desirable in cooler conditions. Warmer conditions may cause concern for field users.

When the ambient temperature is above 90° F., or even above 80° F., as it may be in warmer climates or during seasonably warm times of the year, the surface of a conventional artificial turf may become considerable warmer than the ambient temperature. Various studies have shown that temperature can quickly exceed 120° F. (about 48.8° C.)

when ambient air temperatures of the surroundings are as low as 80° F. and have been found to rise to between 140° F. and 150° F. (60° C. and 65.6° C.) when ambient air temperatures approach 90° F. on clear, sunny days. In some examples, traditional, non-infilled synthetic fields may see high surface temperatures of up to about 50° F. (10° C.) higher than natural grass fields at similar ambient and environmental conditions. Similar ambient and environmental conditions may refer to similarity of the natural and synthetic fields with respect to the ambient temperature, the field altitude or elevation, the ambient air pressure, time of day, the amount of water vapor, and cloud coverage. Natural grass fields rarely exceed 100° F. (37.8° C.) even on clear, hot days and may remain relatively cooler than synthetic fields because the natural fibers transpire in open air. Synthetic turf fields comprise synthetic fibers, often polypropylene and/or polyethylene, and generally do not transpire, thereby trapping heat.

Excessive heating of synthetic fibers may be understood by an explanation of radiant energy. Objects struck by sunlight warm as atoms of the object start to vibrate as some visible and most infrared energy is absorbed. Sunlight comprises a very broad spectrum of radiation. It is estimated that 44% of the spectrum is visible light, 52% infrared and 4% ultraviolet. Radiant heat absorption by the object increases vibration of molecules within the object and is measured as heat or temperature. UV radiation is highly energetic, more so than infrared waves. The energy in UV radiation is strong enough to split certain molecules apart and may cause degradation of plastic polymers like polyethylene and polypropylene. As such plastics that are intended to be exposed and used in an outdoor environment frequently include UV absorber additives to prevent UV degradation. UV absorbers absorb the high energy of UV radiation and convert it to heat energy in the molecules the compound is imbedded in. While UV energy may only consist of 4% of sunlight, the high energy radiation transitions to a lot of heat within the plastic molecule. Conversely, when natural fibers receive sunlight and its radiant energy, the natural fibers transpire, releasing water vapor which evaporates thereby causing cooling.

As provided above, synthetic turf fields comprise synthetic materials that absorb the radiant energy, producing heat. Temperatures have been found to be even higher for synthetic fields having a conventional crumb rubber infill dispersed throughout, i.e., between 140° F. and 150° F. (60° C. and 65.6° C.) when ambient air temperatures approach 90° F. on clear, sunny days. Crumb rubber infill comprises small black rubber granules or pellets and has historically been sourced from recycled tires. A conventional crumb rubber infill typically comprises 100% rubber or 100% recycled tire rubber+/−standard acceptable tolerances of impurities. In further examples, a conventional crumb rubber infill may consist essentially of 100% rubber or 100% recycled rubber+/−standard acceptable tolerances of impurities. Concerns exist with whether potential toxins from the crumb rubber can seep into the water supply or be absorbed through the skin, ingested orally, or inhaled by field users as temperatures increase. A crumb rubber infill may increase the heat index on a field by between 15° F. to 40° F. Field users on such hot fields experience a greater chance of health related issues such as discomfort, skin abrasions, dehydration, and possibly heat stroke. To combat these elevated temperatures, the field is often wet with water, but the cooling effect of the water spray is often short-lived as temperatures begin to climb again. The compositions of the present disclosure provide an infill that may maintain cooler temperatures at the synthetic turf field surface while also improving surface performance for turf field users.

The infill and infill materials of the present disclosure may maintain a synthetic turf at a temperature about 15° F. to about 25° F. less than the temperature of a comparative synthetic turf having a comparative infill dispersed throughout, wherein the comparative infill consists essentially of conventional crumb rubber infill (+/−standard acceptable tolerances of impurities). Testing may be evaluated based on the temperatures observed when exposed to direct radiant energy, as might be found at a synthetic field on a clear, sunny day. Turf temperatures may be obtained using a laser thermometer with thermal couples installed beneath the turf. Fiber temperatures may also useful and may be obtained using a laser thermometer. The lower temperatures observed with the infill and infill materials of the present disclosure may be critical when ambient temperatures exceed 100° F. (37.8° C.) or 110° F. (43.3° C.).

As used herein, a comparative synthetic turf may refer to a synthetic turf that has a comparative infill dispersed throughout where the comparative infill comprises, or consists essentially of, a conventional crumb rubber infill (the crumb rubber infill comprising or consisting essentially of 100% recycled tire rubber) instead of the infill and infill materials of the present disclosure disposed throughout. In some aspects, a comparative turf may refer to a synthetic turf having a comparative infill consisting essentially of conventional crumb rubber infill (100% recycled tire rubber) disposed throughout the synthetic field instead of the infill and infill materials of the present disclosure disposed throughout. Thus, the comparative synthetic turf may comprise the same materials but may differ according to the presence of a comparative infill. For example, a comparative synthetic turf may be comprised of the same (or similar) synthetic fibers, same (or similar) woven material, and the same (or similar) resinous backing, but may differ in that the comparative infill comprises or consists essentially of a crumb rubber infill.

The comparative synthetic turf may have a crumb rubber infill where the crumb rubber infill comprises (or consists essentially of) about 100% recycled tires. Recycled tires may contain tires comprising about 47% rubber/elastomers such as styrene-butadiene rubber, about 21.5% carbon black, about 16.5% of an appropriate metal such as steel or steel wire, about 5.5% textiles such as polyester or nylon fibers, about 1% zinc oxide, about 1% sulfur, and about 7.5% of additives. Some tires may have carbon black replaced by silica. Additives may include clays or additional crumb rubber from other recycled tires.

The infill and infill materials of the present disclosure may improve additional dimensional and performance properties of a synthetic turf field. The infill may improve surface hardness (i.e., GMAX hardness rating as measured by ASTM Standard F355-A and/or ASTM Specification F1936) of the synthetic turf field. The infill may be characterized by reflectivity, the incorporation of trapped gases, a higher melt temperature, and lower abrasive properties.

In various aspects of the present disclosure, the infill may comprise a polymer resin, a plasticizer, a reflective pigment, a blowing agent, and a filler having a specific gravity greater than 2. More specifically, the infill may comprise a composition comprising from about 40 wt. % to about 60 wt. % of a polyvinyl chloride resin; from about 5 wt. % to about 30 wt. % of a plasticizer; from about 2 wt. % to about 10 wt. % of a reflective pigment; from about 0.01 wt. % to about 0.1 wt. % of a blowing agent; and from about 5 wt. % to about 30 wt. % of a filler, wherein the filler has a specific gravity between 2 and 4.

The infill may comprise a composition comprising from about 40 wt. % to about 60 wt. % of a polyvinyl chloride resin, or from about 40 wt. % to about 55 wt. % a polyvinyl chloride resin, or from about 40 wt. % to about 50 wt. % a polyvinyl chloride resin, or from about 40 wt. % to about 45 wt. % a polyvinyl chloride resin, or from about 45 wt. % to about 60 wt. % a polyvinyl chloride resin, or from about 50 wt. % to about 60 wt. % a polyvinyl chloride resin, or from about 55 wt. % to about 60 wt. % a polyvinyl chloride resin.

The infill may comprise from about 5 wt. % to about 30 wt. % of a plasticizer, or from about 5 wt. % to about 25 wt. % of a plasticizer, or from about 5 wt. % to about 20 wt. % of a plasticizer, or from about 5 wt. % to about 20 wt. % of a plasticizer, or from about 5 wt. % to about 15 wt. % of a plasticizer, or from about 5 wt. % to about 15 wt. % of a plasticizer, or from about 5 wt. % to about 10 wt. % of a plasticizer, or from about 10 wt. % to about 30 wt. % of a plasticizer, or from about 15 wt. % to about 30 wt. % of a plasticizer, or from about 20 wt. % to about 30 wt. % of a plasticizer, or from 25 wt. % to about 30 wt. % of a plasticizer.

Thermoplastic Polymer

The infill of the present disclosure may comprise a thermoplastic polymer resin. The thermoplastic resin may include, but are not limited to polypropylene, polyethylene, ethylene based copolymer (such as ethylene propylene diene terpolymer (EPDM)), polycarbonate, polyamide, polyester, polyoxymethylene (POM), polybutylene terephthalate (PBT), polyethylene terephthalate (PET), poly(arylene ether), poly(alkenyl aromatic), polyolefin, acrylonitrile-butadiene-styrene graft copolymerpolycyclohexylendimethylene terephthalate (PCT), liquid crystal polymers (LPC), polyurethanes, polyphenylene sulfide (PPS), polyphenylene ether (PPE), polyphenylene oxide-polystyrene blends, polystyrene, high impact modified polystyrene, acrylonitrile-butadiene-styrene (ABS) terpolymer, acrylic polymer, polyetherimide (PEI), polyurethane, polyamide, polyester based elastomers, polyetheretherketone (PEEK), poly ether sulphone (PES), and combinations thereof. The compositions may comprise blends and/or other types of combination of resins described above.

In some examples, the thermoplastic polymer of the disclosed infill may comprise a vinyl polymer such as polyvinyl chloride. A polyvinyl chloride may be formed by the polymerization of a vinyl chloride monomer. Polyvinyl chloride as used herein may refer to homopolymers of vinylchloride as well as co- and terpolymers of vinyl chloride with comonomers such as vinyl acetate, vinyl formate, alkyl vinyl ethers, ethylene, propylene, butylenes, vinylidene chloride, alkyl acrylates and alkyl methacrylates, alkyl maleates, alkyl fumarates, and the like. The method of preparation of these resins is not critical and, for example, any of the well-known techniques may be used.

Polyvinyl chloride as the thermoplastic polymer resin of the infill may impart the infill with certain mechanical and physical properties. For example, polyvinyl chloride resin generally has a high melt temperature, for example, greater than 300° F. (about 148.8° C.). A high melting point for the thermoplastic polymer of the infill may ensure minimal or no decomposition of the infill in to the surrounding air, areas, or soil. Polyvinyl chloride is also a lower cost thermoplastic elastomer exhibiting a high abrasion resistance.

The polyvinyl chloride resin may be present in an amount from about 40 wt. % to about 60 wt. %, from about 45 wt. % to about 60 wt. %, from about 50 wt. % to about 60 wt. %, or from about 55 wt. % to about 60 wt. %. In further examples, the polyvinyl chloride resin may be present in an amount from about 40 wt. % to about 55 wt. %, from about 40 wt. % to about 50 wt. %, or from about 40 wt. % to about 45 wt. %.

Plasticizer

The composition forming the infill described herein may comprise a plasticizer. A plasticizer is a compound or a mixture of compounds that may be introduced to a polymer resin to impart softness or flexibility. Thus a plasticizer may be used to attenuate hardness of a given resin. A plasticizer may also lower the melting point of the polymeric resin, which lowers the glass transition temperature and enhances processability of the polymeric resin to which it is added. A typical plasticizer may be defined as an organic liquid that will soften a polymer and make it more workable, as long as the polymer and plasticizer are at least partially compatible. The function of a plasticizer in a given polymer system requires compatibility. Plasticizers are used to adjust hardness (or softness) of a polymer, impart stain resistance, alter tensile properties (such as strength, elongation or flexibility) and to facilitate processability, as required, for a multitude of applications, including without limitation flexible vinyl applications. Plasticizers may also facilitate dispersion of resin (polymer) particles, such as PVC.

Phthalic acid diesters (also known as "phthalates") are common plasticizers in many flexible polymer products, including polyvinyl chloride ("PVC") and other vinyl polymers. Common phthalate plasticizers may include di-isononyl phthalate, diallyl phthalate, di-2-ethylhexyl-phthalate, dioctyl phthalate, and diisodecyl phthalate. Other common plasticizers, used for high temperature applications, may include trimellitates and adipic polyesters. Mixtures of plasticizers may be used to obtain optimum properties.

The composition forming the infill and infill materials of the present disclosure may comprise a plasticizer derived from a natural or renewable resource. Materials derived from natural/renewable resources as an alternative to phthalate plasticizers may include an acylated monoglyceride ester derived from hydrogenated castor oil. Other examples may include epoxidized fatty acid esters derived from epoxidized oils, such as linseed and soybean, trans-esterified with various polyols, as described, e.g., in U.S. Pat. No. 6,797,753. The disclosed infill may comprise a vegetable oil derived plasticizer, such as a soybean oil or a corn oil derived plasticizer. In one example, the plasticizer may be formed by epoxidation and/or transesterification of a vegetable oil such as corn or soy oil. The plasticizer may be added in an amount so that a formed sheet sample comprising composition exhibits a low Shore A hardness when tested using a Shore A durometer. That is, plasticizer may be added in an amount to effect a composition having a Shore A hardness from about 50 A to about 100 A when tested using a Shore A durometer. In some examples, the composition forming the infill may comprise from about 5 wt. % to about 30 wt. % of a vegetable oil derived plasticizer, such as a corn oil or a soy oil derived plasticizer.

Blowing Agent

The composition may comprise a blowing agent. Blowing agents may be used to add air (or trapped gas) to the infill formed from the composition. Methods and compositions for making foamed materials, such as for example thermoplastic materials, have long been known. These methods and compositions may utilize chemical and/or physical blowing agents to form a foamed structure in a polymer resin.

Chemical blowing agents may include, for example, azo compounds, various volatile organic compounds (VOCs), non-chlorinated, partially hydrogenated fluorocarbons (HFCs) and chlorofluorocarbons (CFCs). Water is a common blowing agent. Often, physical blowing agents are dissolved in the polymer or polymer precursor material and then expand volumetrically (at a predetermined temperature/pressure) to contribute to the formation of a foamed structure. Physical blowing agents are frequently used in connection with thermoplastic foams, although chemical blowing agents can be used in place of or in addition to physical blowing agents in connection with thermoplastic foam. For example, it is known to use chemical blowing agents in connection with the formation of polyvinylchloride-based foams. Certain compounds and the compositions that contain them may be both a chemical and a physical blowing agent.

In various aspects, the selection of a suitable blowing agent can depend upon the processing conditions and type of polymer resin selected. The blowing agent may introduce between about 10 wt. % to about 40 wt. % of trapped gases (or air) into pellets formed from the disclosed infill comprising the composition. The introduction of air via blowing agents into the infill creates tiny air pockets throughout the infill pellets. These air pockets may provide insulation from heat in the synthetic field. This may contribute to the ability of the disclosed infill to maintain a synthetic turf at a temperature that is about 15° F. to about 25° F. (about −9.4° C. to about −3.9° C.) cooler than a comparative synthetic turf field having a comparative infill (i.e., crumb rubber infill) dispersed throughout and under substantially similar ambient and environmental conditions. The disclosed infill may provide additional shock absorption or cushioning for a user coming in contact with the surface of the synthetic field. Generally, the infill comprising from 10 wt. % to about 40 wt. % air may improve the surface hardness (measured as a Gmax rating) of the synthetic turf field.

The blowing agent may be present in an amount between about 0.01 wt. % and about 0.1 wt. %, or between about 0.01 wt. % and 0.75 wt. %, or from about 0.01 wt. % to about 0.50 wt. %, or from about 0.01 wt. % to about 0.25 wt. %.

Reflective Pigment

In addition to the thermoplastic resin, filler, and blowing agent, the composition of the present disclosure may include a reflective pigment. A reflective pigment in the infill may reduce or minimize heat at the surface of the synthetic field within which the infill is disposed. As used herein, reflectivity can refer to the ability to scatter light away from the surface of the material without absorbing the light at a given wavelength. The reflective pigments may exhibit reflectivity to both near infrared (NIR) and visible light. In certain examples, the reflective pigment may exhibit reflectivity to the infrared (IR) region. In some examples, the reflective pigment may impart the composition with opacity or an opaque appearance.

Exemplary pigments may include titanium dioxide, zinc sulfide (ZnS), tin oxide, aluminum oxide ($AlO_3$), zinc oxide (ZnO), calcium sulfate, barium sulfate ($BaSO_4$), calcium carbonate (e.g., chalk), magnesium carbonate, antimony oxide ($Sb_2O_3$), white lead (a basic lead carbonate, $2PbCO_3.Pb(OH)_2$), lithopone (a combination of barium sulfate and zinc sulfide), sodium silicate, aluminum silicate, silicon dioxide ($SiO_2$, i.e., silica), mica, clay, talc, metal doped versions of the foregoing materials, and combinations comprising at least one of the foregoing materials. More particularly, the reflective pigment may comprise titanium dioxide. A suitable reflective pigments may include Huntsman Altiris™ 800, an infrared reflective pigment.

The reflective pigment may be present in an amount of from about 1 wt. % to about 10 wt. %, from about 2 wt. % to about 10 wt. %, from about 3 wt. % to about 10 wt. %, from about 1 wt. % to about 9 wt. %, from about 1 wt. % to about 8 wt. %, or from about 1 wt. % to about 5 wt. %. As an example, the composition forming the infill may comprise titanium dioxide in an amount of between 1 wt. % and 10 wt. %. In a further example, the composition may comprise titanium dioxide in an amount between 2 wt. % and 6 wt. %.

Filler

The composition forming the disclosed infill may comprise a filler. A suitable filler may have a higher specific gravity to counteract air introduced to the infill by the blowing agent. The higher specific gravity of the filler may counterbalance the about 10 wt. % to about 40 wt. % of air present in the infill. A filler having a higher specific gravity may allow the infill formed from the composition to have a specific gravity of greater than 1. A specific gravity of the infill that is greater than 1 prevents formed infill pellets from floating in water. Thus, the filled composition forming the infill includes trapped gases that provide heat insulation and cushioning allowing the synthetic field to be less abrasive to a user. The infill may provide these properties while also maintaining the synthetic turf at a temperature that is about 15° F. to about 30° F. lower than a comparative synthetic turf field having a comparative infill disposed therein, wherein the comparative infill comprises a crumb rubber infill. In further examples, the infill may provide these properties while also maintaining the synthetic turf at a temperature that is about 15° F. to about 30° F. lower than a comparative synthetic turf field having a comparative infill disposed throughout, wherein the comparative infill comprises or consists essentially of crumb rubber infill.

Fillers having a higher specific gravity refer to fillers having a specific gravity between 2 and 4. Exemplary fillers may include mineral, inert, or inorganic fillers such as, but not limited to, barium sulfate, calcium sulfate, certain silica powders, certain boron powders, calcium carbonates. In one example, the filler is calcium carbonate having a SG of about 2.7-2.8 at 20° C. These fillers may be present in the composition in an amount of from about 5 wt. % to 30 wt %, based on total weight of the composition. The inclusion of a filler having a specific gravity between 2 and 4 may provide that the infill formed from the composition and in pelletized form has a SG greater than 1. SG of the infill pellets may be determined in a number of ways which may be apparent to one skilled in the art. As an example, the SG of infill pellets of the present disclosure may be determined by combining the infill pellets with a volume of water in a container, weighing the combined infill pellets, removing the water and weighing the water, calculating the volume that the infill pellets took up in the container, and calculating the grams per cubic centimeter for specific gravity.

Additional Components

The additive composition can include an impact modifier, flow modifier, antioxidant, heat stabilizer, light stabilizer, ultraviolet (UV) light stabilizer, UV absorbing additive, plasticizer, lubricant, antistatic agent, anti-fog agent, antimicrobial agent, colorant (e.g., a dye or pigment), surface effect additive, radiation stabilizer, anti-drip agent (e.g., a PTFE-encapsulated styrene-acrylonitrile copolymer (TSAN)), or a combination comprising one or more of the foregoing. For example, a combination of a heat stabilizer and ultraviolet light stabilizer can be used. In general, the additives are used in the amounts generally known to be effective. For example, the total amount of the additive composition can be 0.001 to 10.0 wt %, or 0.01 to 5 wt %, each based on the total weight of all ingredients in the composition.

The composition can include various additives ordinarily incorporated into polymer compositions, with the proviso that the additive(s) are selected so as to not significantly adversely affect the desired properties of the thermoplastic composition (good compatibility for example). Such additives can be mixed at a suitable time during the mixing of the components for forming the composition.

Heat stabilizer additives include organophosphites (e.g. triphenyl phosphite, tris-(2,6-dimethylphenyl)phosphite, tris-(mixed mono- and di-nonylphenyl)phosphite or the like), phosphonates (e.g., dimethylbenzene phosphonate or the like), phosphates (e.g., trimethyl phosphate, or the like), or combinations comprising at least one of the foregoing heat stabilizers. The heat stabilizer may be tin oxide. The heat stabilizer may be used in amounts of about 0.01 wt. % to about 5 wt %, or more specifically from about 0.05 wt. % to about 2 wt. %, based on the total weight of the composition.

The composition may further comprise a lubricant. As an example, lubricants can include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. In some examples, the lubricant may comprise a benzoin. Lubricants can generally be used in amounts of from greater than 0 to about 20 wt. %, based on the total weight of the composition.

Light stabilizers, in particular ultraviolet light (UV) absorbing additives, may include a benzotriazole compound, a triazine compound, or a combination thereof as the UV absorbing component. Examples of suitable UV absorbing components include, but are not limited to 2-(2'-Hydroxy-5'-t-octylphenyl) benzotriazole (e.g., CYASORB® UV5411, available from Cytec Industries) (UV5411), 2-(2 hydroxy-3,5 dicumyl) benzotriazole (e.g., Tinuvin® 234, available from BASF) (UVA 234), phenol, 2,2'-methylenebis(6-(2H-benzotriazol-2-yl)-4-(1,1,3,3-tetramethylbutyl)-(e.g., Tinuvin® 360, available from BASF) (LA31RG/T360), phenol, 2-(4,6-diphenyl-1,3,5-triazin-2-yl)-5-(hexyloxy)-(e.g., Tinuvin® 1577, available from BASF) (T1577), 1,3-Bis((2-cyano-3,3-diphenylacryloyl)oxy)-2,2-bis(((2-cyano-3,3-diphenylacryloyl)oxy)methyl) propane (e.g., Uvinul® 3030, available from BASF) (UV3030), 2,2'-(1,4-phenylene)bis-4h-3,1-benzoxazin-4-one (e.g., CYASORB® UV-3638, available from Cytec Industries) (UV-3638), and combinations thereof. In one particular aspect, the UV absorbing component is phenol, 2,2'-methylenebis(6-(2H-benzotriazol-2-yl)-4-(1,1,3,3-tetramethylbutyl)-(LA31RG/T360). combinations comprising at least one of the foregoing light stabilizers. The UV stabilizers may be present in an amount of from about 0.01 to about 2 wt %, specifically, from about 0.25 to about 1.5 wt %, based upon the total weight of polymer in the composition.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate; amides of beta-(3,5-di-tert-butyl-4-hydroxyphenyl)-propionic acid, or combinations comprising at least one of the foregoing antioxidants. Antioxidants are used in amounts of about 0.01 wt. % to about 0.1 wt. %, based on the total weight of the composition, excluding any filler.

Exemplary flame retardants include, but are not limited to, halogenated flame retardants, like tetrabromo bisphenol A oligomers such as BC58 and BC52, brominated polystyrene or poly(dibromo-styrene), brominated epoxies, decabromo-diphenyleneoxide, pentabrombenzyl acrylate monomer, pentabromobenzyl acrylate polymer, ethylene-bis(tetrabromophthalimide, bis(pentabromobenzyl)ethane, metal hydroxides like $Mg(OH)_2$ and $Al(OH)_3$, melamine cyanurate, phosphor based flame retardant systems like red phosphorus, melamine polyphosphate, phosphate esters, metal phosphinates, ammonium polyphosphates, expandable graphites, sodium or potassium perfluorobutane sulfate, sodium or potassium perfluorooctane sulfate, sodium or potassium diphenylsulfone sulfonate and sodium- or potassium-2,4,6-trichlorobenzoate and N-(p-tolylsulfonyl)-p-toluenesulfimide potassium salt, N—(N'-benzylaminocarbonyl) sulfanylimide potassium salt, antimony tri-hydroxide based, or a combination containing at least one of the foregoing. Flame retardants are generally used in amounts of about 1.0 wt. % to about 10 wt. % of the composition, or from about 1.0 wt. % to about 5 wt. %, but could be used in other amounts.

In various examples, the composition comprises a pigment, dye, or colorant to be dispersed throughout. Exemplary pigments include for example, inorganic pigments such as metal oxides and mixed metal oxides such as zinc oxide, titanium dioxides, iron oxides or the like; sulfides such as zinc sulfides, or the like; aluminates; sodium sulfosilicates; sulfates and chromates; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations including at least one of the foregoing pigments. Dyes may include, for example, organic dyes; hydrocarbon and substituted hydrocarbon dyes; polycyclic aromatic hydrocarbons; scintillation dyes; aryl- or heteroaryl-substituted poly (2-8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as anti-stokes shift dyes which absorb in the near infrared wavelength and emit in the visible wavelength, or the like; luminescent dyes; or combinations including at least one of the foregoing dyes. Pigments, colorants, and dyes may be used in varying amounts. In some examples, pigments, colorants, and dyes may be used in an amount between about 1 wt. % and about 10 wt. %, or from about 2 wt. % to about 5 wt. %.

Methods of Manufacture

The compositions of the present disclosure comprising the foregoing components may be formed by a variety of methods involving intimate admixing of the materials with any additional additives desired in the formulation. A method of forming the composition may comprise combining: from about 40 wt. % to about 60 wt. % of a polyvinyl chloride resin; from about 5 wt. % to about 30 wt. % of a plasticizer; from about 2 wt. % to about 10 wt. % of a reflective pigment; from about 0.01 wt. % to about 0.1 wt. % of a blowing agent; and from about 5 wt. % to about 30 wt. % of a filler, wherein the filler has a specific gravity between 2 and 4, at a temperature and for a time sufficient to form a blended composition, wherein a sheet formed from the blended composition has a Shore A hardness between 50 A and 100 A when tested using a Shore A durometer, wherein a pelletized form of blended composition has a specific gravity greater than 1, and wherein the blended composition has a melting point greater than 200° F. In various examples, the disclosed composition comprises a blend of the foregoing components. Because of the availability of melt blending equipment in commercial polymer processing facilities, melt processing methods may be preferred for forming the composition. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. In some aspects, the melt processed composition exits processing equipment such as an extruder through small exit holes in a die. The resulting strands of molten resin may be cooled by passing the strands through a water bath. The cooled strands can be chopped into small pellets (i.e., up to about 5 mm in varying dimensions) as infill for packaging and further handling. In a specific example, the infill may be formed into smooth rounded pellets. These rounded pellets may be less abrasive than ground conventional crumb rubber and other infill products. In further examples, the infill may be formed into other shapes including random configurations (i.e., stars, triangles, polygons, hearts, etc) that may be useful for interlocking traction of the infill pellets for improved performance as well as impact attenuation (with respect to a Gmax rating of synthetic turf).

Compositions can be manufactured by various methods, including batch or continuous techniques that employ kneaders, extruders, mixers, and the like. For example, the composition can be formed as a melt blend employing a twin-screw extruder. In some embodiments at least some of the components are added sequentially. For example, the polymer resin (or polyvinyl chloride), plasticizer, reflective pigment, mineral filler, and any additional additives may be added to the extruder at the feed throat or in feeding sections adjacent to the feed throat, or in feeding sections adjacent to the feed throat, while the flame retardant component can be added to the extruder in a subsequent feeding section downstream. Alternatively, the sequential addition of the components may be accomplished through multiple extrusions. A composition may be made by pre-extrusion of selected components, such as the polyvinyl chloride and the plasticizer to produce a pelletized mixture. A second extrusion can then be employed to combine the pre-extruded components with the remaining components. The flame retardant component can be added as part of a masterbatch or directly.

In various aspects, the foregoing components may be combined in a Banbury® high speed mixer. Other low shear processes, including but not limited to hand mixing, can also accomplish this blending. The blend is then fed into the throat of a twin-screw extruder via a hopper. Alternatively, at least one of the components may be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be up to about 5 mm as desired.

It will be appreciated by those skilled in the art that the order and manner in which the blowing agent combination of the present disclosure is added to form the composition does not generally affect the operability of the present disclosure. For example, in the case of polyurethane foams, it is possible that the various components of the blowing agent combination, and even the components of the composition, not be mixed in advance of introduction to the foaming equipment, or even that the components are not added to the same location in the foaming equipment. Thus, in certain embodiments it may be desired to introduce one or more components of the blowing agent combination in a blender with the expectation that the components will come together in the foaming equipment and/or operate more effectively in this manner.

Properties

As provided herein, the disclosed infill composition may improve surface performance of an artificial or synthetic turf field while keeping turf surface temperatures cooler than a comparative synthetic field having a comparative infill which comprises crumb rubber. The composition forming the infill includes trapped gases that provide heat insulation and cushioning allowing the synthetic field to be less abrasive to a user. The infill may provide these properties while also maintaining the synthetic turf at a temperature that is about 15° F. to about 25° F. lower than a comparative synthetic field having a comparative infill dispersed throughout, where the comparative infill consists essentially of crumb rubber and the comparative infill is at similar ambient and environmental conditions. Substantially similar environmental conditions may refer to similarity of the synthetic fields with respect to the ambient temperature, the field altitude or elevation, the ambient air pressure, time of day, the amount of water vapor in the air, and cloud coverage. In further examples, similar or substantially similar ambient and environmental conditions may refer to laboratory conditions configured to replicate the effect of radiant solar energy on an outdoor turf field. Laboratory conditions may be performed on individual, small scale samples of synthetic turf fields. For example, a sample of synthetic turf comprising the disclosed infill and infill materials dispersed throughout and a sample of synthetic turf having an infill comprising crumb rubber (or consisting essentially of crumb rubber) dispersed throughout may be subjected to direct radiant energy in a controlled environment having the same, or substantially the same, temperature, pressure, elevation, humidity, and incidence of radiant energy within appreciable standard deviation. Temperatures of the synthetic turf field (or laboratory scale, trial portions of synthetic turf fields) may be obtained using a laser thermometer with thermal couples installed beneath the synthetic turf (or small scale, trial portion of synthetic turf).

Temperature testing of synthetic turf systems may be observed according to a number of methods. As an example, several synthetic turfs may be evaluated each using the same synthetic turf carpet with only the infill varied between the systems. The synthetic turfs may be exposed to infrared heat lamps for a prolonged period to simulate the heating of the sun in a controlled environment. Each laboratory scale, trial portion of synthetic turf may be constructed and prepared per EN 122229: Surfaces for sports areas—Procedure for the preparation of synthetic turf and textile pieces. For comparison, laboratory scale, trial samples of synthetic turf comprising the infill and infill materials of the present disclosure and laboratory scale, trial samples of synthetic turf having an infill consisting essentially of conventional crumb rubber infill may be prepared according to EN 12229. As an example, samples may comprise a synthetic turf carpet having a 2.25" slit film and a ¾" pile (grass-like polymer fiber) exposure, as well as the respective infill pellets dispersed throughout. The samples may be conditioned to room temperature for at least about 24 hours. Temperature sensors may be used to capture and record measurements to a digital data logger at a determined time interval. For example, thermos-couples may be mounted in series to the samples to provide a two point average of the surface temperature, logging data every 60 seconds. Samples may be observed for a pre-determined time period, for example about 4 hours. The hourly average temperature recorded at each temperature sensor and the average of each temperature sensor may be used to evaluate the performance of each the samples. Samples comprising the infill and infill materials of the present disclosure dispersed throughout the synthetic turf field sample may exhibit lower average surface temperatures for the duration of the time period than the synthetic turf field samples having the crumb rubber infill dispersed throughout. For example, average temperatures may be up to about 40° F. lower within the same time period.

In further aspects, the disclosed infill compositions may improve the surface hardness of a synthetic turf. Surface hardness, also described as impact attenuation or the ability of the surface to resist indentation, may be evaluated according to its Gmax rating. The Gmax rating may refer to the ratio of the maximum acceleration (deceleration) experienced during an impact, to the normal rate of acceleration due to gravity. The higher the Gmax value, the poorer the shock-attenuation performance of the surface. A synthetic turf field may have an improved Gmax rating when the disclosed infill is disposed therein. The infill includes from about 10 wt. % to about 40 wt. % of trapped gases (or air). This allows the infill to perform as a greater shock absorber or cushion in a synthetic turf field than a conventional crumb rubber infill or infill without a blowing or foaming agent disposed within a synthetic turf field at similar ambient and environmental conditions. Thus the present infill provides additional padding and insulation in a synthetic field which may improve the Gmax rating and reduce abrasions or injuries to users, such as athletes, upon impact with the field. The trapped gases of the infill may provide heat insulation which further contributes to cooling at the surface the synthetic turf field.

The disclosed infill may have a melting temperature of greater than about 200° F. (about 93.3° C.), which may be attributed to polyvinyl chloride resin as the thermoplastic polymer. A higher melting point may result that the infill does not melt or decompose at elevated summer outdoor temperatures upwards of about 100° F. (about 37.8° C.). The infill may maintain integrity and may not leach. This is critical when a synthetic turf field experiences summer ambient temperatures exceeding 110 F.

The composition forming the infill of the present disclosure may have a particular hardness when evaluated using a Shore A hardness durometer. More specifically, a sheet formed from the composition may have a low Shore A hardness. For example, a sheet of comprising the compounded composition may have a Shore A hardness of between about 50 A and 100 A when tested using a Shore A durometer. A sheet of the composition may refer to a thin continuous portion of the material. Testing for Shore A hardness may be tested according to ASTM D2240, for example.

Definitions

It is to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural equivalents unless the context clearly dictates otherwise. Thus, for example, reference to "a polycarbonate polymer" includes mixtures of two or more polycarbonate polymers.

Ranges can be expressed herein as from one particular value to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±5% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

"ppm" refers to parts per million.

As used herein the terms "weight percent," "weight %," and "wt. %" of a component, which can be used interchangeably, unless specifically stated to the contrary, are based on the total weight of the formulation or composition in which the component is included. For example, if a particular element or component in a composition or article is said to have 8% by weight, it is understood that this percentage is relative to a total compositional percentage of 100% by weight.

As used herein, the terms "weight average molecular weight" or "Mw" can be used interchangeably, and are defined by the formula:

$$M_w = \frac{\sum N_i M_i^2}{\sum N_i M_i},$$

where Mi is the molecular weight of a chain and Ni is the number of chains of that molecular weight. Mw can be determined for polymers, e.g. polycarbonate polymers, by methods well known to a person having ordinary skill in the art using molecular weight standards, e.g. polycarbonate standards or polystyrene standards, preferably certified or traceable molecular weight standards. Polystyrene basis refers to measurements using a polystyrene standard.

The term "polyvinyl chloride" as used herein may refer to both homopolymers of vinylchloride as well as co- and terpolymers of vinyl chloride with comonomers such as vinyl acetate, vinyl formate, alkyl vinyl ethers, ethylene, propylene, butylenes, vinylidene chloride, alkyl acrylates and alkyl methacrylates, alkyl maleates, alkyl fumarates, and the like. The method of preparation of these resins is not critical and, for example, any of the well-known suspension techniques may be employed.

As used herein, "specific gravity" (SG) refers to the ratio of the density of a substance to the density of a reference substance. It may be the ratio of the mass of a substance to the mass of a reference substance for the same given volume. The reference substance is often water at its most dense state, i.e., 4° C., for liquids, or air at room temperature, i.e., about 21° C. At 4° C., the specific gravity of water is 1.

A Gmax rating as described herein measures the shock-attenuation performance of sports surfaces and is the ratio of maximum negative acceleration on impact in units of gravities to the acceleration due to gravity. According to Penn State's Center for Sports Surface Research, GMAX testing measures how many G's of force a field can absorb upon impact, and how many are returned to the athlete. A high GMAX test value means the field is absorbing less impact, and returning more force to the player (resulting in a potentially dangerous situation), than a low GMAX test value. Testing g-max values involves measuring the shock-attenuation performance of a playing surface in situ, and comparing the results against a standard. The most commonly used standard is the one established by ASTM International (ASTM). For synthetic surfaces, ASTM requires that the reported g-max value for every test point be less than 200 g's (as measured in accordance with ASTM Standard F355-A and ASTM Specification F1936).

As used herein, Shore hardness (or the specific type of Shore hardness, Shore A) is a measure of the hardness of a given material or how resistant it will be to permanent indentation. It is measured by the depth of indentation that is created on the material with a specified force. The measuring instrument is a durometer.

Aspects

The present disclosure comprises at least the following aspects.

Aspect 1. A composition comprising: a polyvinyl chloride resin; a plasticizer; a reflective pigment; a blowing agent; and a filler having a specific graving of greater than 2, wherein a sheet formed from the composition has a low Shore A hardness when tested using a Shore A durometer; wherein a pelletized form of the composition has a specific gravity greater than 1, and wherein the composition has a melting point greater than 200° F.

Aspect 2. The composition of aspect 1, wherein a sheet formed from the composition has exhibits a Shore A hardness of between about 50 A and 100 A when tested using a Shore A durometer.

Aspect 3. The composition of aspect 1, wherein the plasticizer is derived from a naturally occurring source.

Aspect 4. The composition of aspect 1, wherein the plasticizer is derived from corn or soy oil.

Aspect 5. The composition of aspect 1, wherein the reflective pigment is an infrared reflective pigment.

Aspect 6. The composition of aspect 1, wherein the reflective pigment comprises titanium dioxide.

Aspect 7. The composition of aspect 1, wherein the filler has a specific gravity greater than 3.

Aspect 8. The composition of aspect 1, wherein the filler has a specific gravity between 3 and 4.

Aspect 9. The composition of aspect 1, wherein the filler comprises barium sulfate.

Aspect 10. The composition of aspect 1, wherein the filler comprises calcium sulfate.

Aspect. The composition of aspect 1, wherein the filler comprises calcium carbonate.

Aspect 11. The composition of aspect 1, wherein the composition has a melting temperature greater than about 300° F.

Aspect 12. The composition of aspect 1, wherein pellets formed from the composition comprise from about 10 wt. % to about 40 wt. % air or trapped gases.

Aspect 13. The composition of aspect 1, wherein pellets formed from the composition comprise from about 20 wt. % to about 40 wt. % air or trapped gases.

Aspect 14. The composition of aspect 1, wherein pellets formed from the composition comprise from about 30 wt. % to about 40 wt. % air or trapped gases.

Aspect 15. The composition of aspect 1, wherein pellets formed from the composition comprise from about 10 wt. % to about 30 wt. % air or trapped gases.

Aspect 16. The composition of aspect 1, wherein pellets formed from the composition comprise from about 10 wt. % to about 20 wt. % air or trapped gases.

Aspect 17. The composition of aspect 1, wherein pellets formed from the composition have a size up to about 5 mm.

Aspect 18. The composition of aspect 1, wherein the composition is infill for an artificial turf field.

Aspect 19. The composition of aspect 1, wherein the composition is disposed as an infill for an artificial turf field and wherein the infill maintains the artificial turf field at a temperature that is up to about 40° F. less than the temperature of a comparative artificial turf under substantially similar ambient and environmental conditions, wherein a comparative infill of the comparative artificial turf consists essentially of crumbed rubber infill.

Aspect 20. The composition of aspect 1, wherein the composition is disposed as an infill for an artificial turf field and wherein the infill maintains the artificial turf field at a temperature that is up to about 25° F. less than the temperature of a comparative artificial turf under substantially similar ambient and environmental conditions, wherein a comparative infill of the comparative artificial turf consists essentially of crumbed rubber infill.

Aspect 21. The composition of aspect 1, wherein the composition is disposed as an infill for an artificial turf field and wherein the infill maintains the artificial turf field at a temperature that is about 15° F. to about 25° F. less than the temperature of a comparative artificial turf under substantially similar ambient and environmental conditions, wherein a comparative infill of the comparative artificial turf consists essentially of crumbed rubber infill.

Aspect 22. An infill formed from a composition, the composition comprising: from about 40 wt. % to about 60 wt. % of a polyvinyl chloride resin; from about 5 wt. % to about 30 wt. % of a plasticizer; from about 2 wt. % to about 10 wt. % of a reflective pigment; from about 0.01 wt. % to about 0.1 wt. % of a blowing agent; and from about 5 wt. % to about 30 wt. % of a filler, wherein the filler has a specific gravity of greater than 2, wherein a sheet formed from the composition has a Shore A hardness between 50 A and 100 A when tested using a Shore A durometer, wherein the composition has a melting point greater than 200° F., and wherein the infill comprises the composition in pellet form and wherein the pellet form of the infill comprising the composition exhibit a specific gravity greater than 1.

Aspect 23. The infill of aspect 22, wherein the infill is disposed throughout an artificial turf field and maintains the temperature of the artificial turf field at a temperature up to about 30° F. less than the temperature of a substantially similar artificial turf field having a crumbed rubber infill disposed throughout and at similar ambient and environmental conditions.

Aspect 24. The infill of aspect 22, wherein the infill is disposed throughout an artificial turf field and maintains the temperature of the artificial turf field at a temperature about 15° F. to about 25° F. less than the temperature of a comparative artificial turf field having a comparative infill disposed therein at similar ambient and environmental conditions, wherein the comparative infill comprises a crumbed rubber infill.

Aspect 25. The infill of aspect 22, wherein the composition comprises from about 45 wt. % to about 60 wt. % of a polyvinyl chloride resin; from about 5 wt. % to about 30 wt. % of a plasticizer; from about 2 wt. % to about 10 wt. % of a reflective pigment; from about 0.01 wt. % to about 0.1 wt. % of a blowing agent; and from about 5 wt. % to about 30 wt. % of a filler, wherein the filler has a specific gravity of greater than 2, wherein a sheet formed from the composition has a Shore A hardness between 50 A and 100 A when tested using a Shore A durometer, wherein the composition has a melting point greater than 200° F., and wherein the infill comprises the composition in pellet form and wherein the pellet form of the infill comprising the composition exhibit a specific gravity greater than 1.

Aspect 26. The infill of aspect 22, wherein the composition comprises from about 50 wt. % to about 60 wt. % of a polyvinyl chloride resin; from about 5 wt. % to about 30 wt. % of a plasticizer; from about 2 wt. % to about 10 wt. % of a reflective pigment; from about 0.01 wt. % to about 0.1 wt. % of a blowing agent; and from about 5 wt. % to about 30 wt. % of a filler, wherein the filler has a specific gravity of greater than 2, wherein a sheet formed from the composition has a Shore A hardness between 50 A and 100 A when tested using a Shore A durometer, wherein the composition has a melting point greater than 200° F., and wherein the infill comprises the composition in pellet form and wherein the pellet form of the infill comprising the composition exhibit a specific gravity greater than 1.

Aspect 27. The infill of aspect 22, wherein the composition comprises from about 55 wt. % to about 60 wt. % of a polyvinyl chloride resin; from about 5 wt. % to about 30 wt. % of a plasticizer; from about 2 wt. % to about 10 wt. % of a reflective pigment; from about 0.01 wt. % to about 0.1 wt. % of a blowing agent; and from about 5 wt. % to about 30 wt. % of a filler, wherein the filler has a specific gravity of greater than 2, wherein a sheet formed from the composition has a Shore A hardness between 50 A and 100 A when tested using a Shore A durometer, wherein the composition has a melting point greater than 200° F., and wherein the infill comprises the composition in pellet form and wherein the pellet form of the infill comprising the composition exhibit a specific gravity greater than 1.

Aspect 28. The infill of aspect 22, wherein the composition comprises from about 40 wt. % to about 60 wt. % of a polyvinyl chloride resin; from about 5 wt. % to about 25 wt.

% of a plasticizer; from about 2 wt. % to about 10 wt. % of a reflective pigment; from about 0.01 wt. % to about 1 wt. % of a blowing agent; and from about 5 wt. % to about 30 wt. % of a filler, wherein the filler has a specific gravity of greater than 2, wherein a sheet formed from the composition has a Shore A hardness between 50 A and 100 A when tested using a Shore A durometer, wherein the composition has a melting point greater than 200° F., and wherein the infill comprises the composition in pellet form and wherein the pellet form of the infill comprising the composition exhibit a specific gravity greater than 1.

Aspect 29. The infill of aspect 22, wherein the composition comprises from about 40 wt. % to about 60 wt. % of a polyvinyl chloride resin; from about 5 wt. % to about 20 wt. % of a plasticizer; from about 2 wt. % to about 10 wt. % of a reflective pigment; from about 0.01 wt. % to about 1 wt. % of a blowing agent; and from about 5 wt. % to about 30 wt. % of a filler, wherein the filler has a specific gravity of greater than 2, wherein a sheet formed from the composition has a Shore A hardness between 50 A and 100 A when tested using a Shore A durometer, wherein the composition has a melting point greater than 200° F., and wherein the infill comprises the composition in pellet form and wherein the pellet form of the infill comprising the composition exhibit a specific gravity greater than 1.

Aspect 30. The infill of aspect 22, wherein the composition comprises from about 40 wt. % to about 60 wt. % of a polyvinyl chloride resin; from about 5 wt. % to about 15 wt. % of a plasticizer; from about 2 wt. % to about 10 wt. % of a reflective pigment; from about 0.01 wt. % to about 1 wt. % of a blowing agent; and from about 5 wt. % to about 30 wt. % of a filler, wherein the filler has a specific gravity of greater than 2, wherein a sheet formed from the composition has a Shore A hardness between 50 A and 100 A when tested using a Shore A durometer, wherein the composition has a melting point greater than 200° F., and wherein the infill comprises the composition in pellet form and wherein the pellet form of the infill comprising the composition exhibit a specific gravity greater than 1.

Aspect 31. The infill of aspect 22, wherein the composition comprises from about 40 wt. % to about 60 wt. % of a polyvinyl chloride resin; from about 5 wt. % to about 10 wt. % of a plasticizer; from about 2 wt. % to about 10 wt. % of a reflective pigment; from about 0.01 wt. % to about 1 wt. % of a blowing agent; and from about 5 wt. % to about 30 wt. % of a filler, wherein the filler has a specific gravity of greater than 2, wherein a sheet formed from the composition has a Shore A hardness between 50 A and 100 A when tested using a Shore A durometer, wherein the composition has a melting point greater than 200° F., and wherein the infill comprises the composition in pellet form and wherein the pellet form of the infill comprising the composition exhibit a specific gravity greater than 1.

Aspect 32. The infill of aspect 22, wherein the composition comprises from about 40 wt. % to about 60 wt. % of a polyvinyl chloride resin; from about 5 wt. % to about 30 wt. % of a plasticizer; from about 2 wt. % to about 10 wt. % of a reflective pigment; from about 0.01 wt. % to about 0.75 wt. % of a blowing agent; and from about 5 wt. % to about 30 wt. % of a filler, wherein the filler has a specific gravity of greater than 2, wherein a sheet formed from the composition has a Shore A hardness between 50 A and 100 A when tested using a Shore A durometer, wherein the composition has a melting point greater than 200° F., and wherein the infill comprises the composition in pellet form and wherein the pellet form of the infill comprising the composition exhibit a specific gravity greater than 1.

Aspect 33. The infill of aspect 22, wherein the composition comprises from about 40 wt. % to about 60 wt. % of a polyvinyl chloride resin; from about 5 wt. % to about 30 wt. % of a plasticizer; from about 2 wt. % to about 10 wt. % of a reflective pigment; from about 0.01 wt. % to about 0.5 wt. % of a blowing agent; and from about 5 wt. % to about 30 wt. % of a filler, wherein the filler has a specific gravity of greater than 2, wherein a sheet formed from the composition has a Shore A hardness between 50 A and 100 A when tested using a Shore A durometer, wherein the composition has a melting point greater than 200° F., and wherein the infill comprises the composition in pellet form and wherein the pellet form of the infill comprising the composition exhibit a specific gravity greater than 1.

Aspect 34. The infill of aspect 22, wherein the composition comprises from about 40 wt. % to about 60 wt. % of a polyvinyl chloride resin; from about 5 wt. % to about 30 wt. % of a plasticizer; from about 2 wt. % to about 10 wt. % of a reflective pigment; from about 0.01 wt. % to about 0.25 wt. % of a blowing agent; and from about 5 wt. % to about 30 wt. % of a filler, wherein the filler has a specific gravity of greater than 2, wherein a sheet formed from the composition has a Shore A hardness between 50 A and 100 A when tested using a Shore A durometer, wherein the composition has a melting point greater than 200° F., and wherein the infill comprises the composition in pellet form and wherein the pellet form of the infill comprising the composition exhibit a specific gravity greater than 1.

Aspect 35. The infill of aspect 22, wherein the composition comprises from about 40 wt. % to about 55 wt. % of a polyvinyl chloride resin.

Aspect 36. The infill of aspect 22, wherein the composition comprises from about 40 wt. % to about 50 wt. % of a polyvinyl chloride resin.

Aspect 37. The infill of aspect 22, wherein the composition comprises from about 40 wt. % to about 45 wt. % of a polyvinyl chloride resin.

Aspect 38. The infill of aspect 22, wherein the composition comprises from about 45 wt. % to about 60 wt. % of a polyvinyl chloride resin.

Aspect 39. The infill of aspect 22, wherein the composition comprises from about 50 wt. % to about 60 wt. % of a polyvinyl chloride resin.

Aspect 40. The infill of aspect 22, wherein the composition comprises from about 55 wt. % to about 60 wt. % of a polyvinyl chloride resin.

Aspect 41. The infill of aspect 22, wherein the composition comprises from about 55 wt. % to about 60 wt. % of a polyvinyl chloride resin.

Aspect 42. The infill of aspect 22, wherein the composition comprises from about 5 wt. % to about 25 wt. % of the filler.

Aspect 43. The infill of aspect 22, wherein the composition comprises from about 5 wt. % to about 20 wt. % of the filler.

Aspect 45. The infill of aspect 22, wherein the composition comprises from about 5 wt. % to about 15 wt. % of the filler.

Aspect 46. The infill of aspect 22, wherein the composition comprises from about 5 wt. % to about 10 wt. % of the filler.

Aspect 47. The infill of aspect 22, wherein the composition comprises from about 10 wt. % to about 30 wt. % of the filler.

Aspect 48. The infill of aspect 22, wherein the composition comprises from about 15 wt. % to about 30 wt. % of the filler.

Aspect 49. The infill of aspect 22, wherein the composition comprises from about 20 wt. % to about 30 wt. % of the filler.

Aspect 50. The infill of aspect 22, wherein the composition comprises from about 25 wt. % to about 30 wt. % of the filler.

Aspect 51. The infill of aspect 22, wherein the composition comprises from about 5 wt. % to about 25 wt. % of the plasticizer.

Aspect 52. The infill of aspect 22, wherein the composition comprises from about 5 wt. % to about 20 wt. % of the plasticizer.

Aspect 53. The infill of aspect 22, wherein the composition comprises from about 5 wt. % to about 15 wt. % of the plasticizer.

Aspect 54. The infill of aspect 22, wherein the composition comprises from about 5 wt. % to about 10 wt. % of the plasticizer.

Aspect 55. The infill of aspect 22, wherein the composition comprises from about 10 wt. % to about 30 wt. % of the plasticizer.

Aspect 56. The infill of aspect 22, wherein the composition comprises from about 15 wt. % to about 30 wt. % of the plasticizer.

Aspect 57. The infill of aspect 22, wherein the composition comprises from about 20 wt. % to about 30 wt. % of the plasticizer.

Aspect 58. The infill of aspect 22, wherein the composition comprises from about 25 wt. % to about 30 wt. % of the plasticizer.

Aspect 59. The infill of aspect 22, wherein the composition comprises from about 2 wt. % to about 8 wt. % of the reflective pigment.

Aspect 60. The infill of aspect 22, wherein the composition comprises from about 2 wt. % to about 5 wt. % of the reflective pigment.

Aspect 61. The infill of aspect 22, wherein the composition comprises from about 4 wt. % to about 10 wt. % of the reflective pigment.

Aspect 62. The infill of aspect 22, wherein the composition comprises from about 6 wt. % to about 10 wt. % of the reflective pigment.

Aspect 63. The infill of aspect 22, wherein the composition comprises from about 0.05 wt. % to about 1 wt. % of the blowing agent.

Aspect 64. The infill of aspect 22, wherein the composition comprises from about 0.1 wt. % to about 1 wt. % of the blowing agent.

Aspect 65. The infill of aspect 22, wherein the composition comprises from about 0.25 wt. % to about 1 wt. % of the blowing agent.

Aspect 66. The infill of aspect 22, wherein the composition comprises from about 0.5 wt. % to about 1 wt. % of the blowing agent.

Aspect 67. The infill of aspect 22, wherein the composition comprises from about 0.01 wt. % to about 0.15 wt. % of the blowing agent.

Aspect 68. The infill of aspect 22, wherein the composition comprises from about 0.01 wt. % to about 0.25 wt. % of the blowing agent.

Aspect 69. The infill of aspect 22, wherein the composition comprises from about 0.01 wt. % to about 0.5 wt. % of the blowing agent.

Aspect 70. The infill of aspect 22, wherein the composition comprises from about 0.01 wt. % to about 0.75 wt. % of the blowing agent.

Aspect 71. A method of forming a composition comprising: combining: from about 40 wt. % to about 60 wt. % of a polyvinyl chloride resin; from about 5 wt. % to about 30 wt. % of a plasticizer; from about 2 wt. % to about 10 wt. % of a reflective pigment; from about 0.01 wt. % to about 0.1 wt. % of a blowing agent; and from about 5 wt. % to about 30 wt. % of a filler, wherein the filler has a specific gravity between 2 and 4, at a temperature and for a time sufficient to form a blended composition, wherein a sheet formed from the blended composition has a Shore A hardness between 50 A and 100 A when tested using a Shore A durometer, wherein a pelletized form of blended composition has a specific gravity greater than 1, and wherein the blended composition has a melting point greater than 200° F.

Aspect 72. The method of aspect 71, further comprising forming pellets from the blended composition where the pellets have a size up to about 5 mm.

Aspect 73. The method of aspect 71, wherein the combining is performed in an extruder.

Aspect 74. A synthetic turf field, the synthetic turf field having an infill dispersed throughout wherein the infill is formed from a composition comprising from about 40 wt. % to about 60 wt. % of a polyvinyl chloride resin; from about 5 wt. % to about 30 wt. % of a plasticizer; from about 2 wt. % to about 10 wt. % of a reflective pigment; from about 0.01 wt. % to about 0.1 wt. % of a blowing agent; and from about 5 wt. % to about 30 wt. % of a filler, wherein the filler has a specific gravity between 2 and 4, wherein a sheet formed from the blended composition has a Shore A hardness between 50 A and 100 A when tested using a Shore A durometer, wherein the infill comprises the composition in a pellet form, wherein the infill has a specific gravity greater than 1, and wherein composition has a melting point greater than 200° F.

Aspect 75. The synthetic turf field of aspect 74, wherein the synthetic turf field has a temperature that is about 15° F. to about 40° F. less than a comparative synthetic turf field having a comparative infill dispersed throughout, wherein the comparative synthetic turf field is in substantially similar ambient and environmental conditions, and wherein the comparative infill comprises crumb rubber.

Aspect 76. A composition comprising: a polyvinyl chloride resin; a plasticizer; a reflective pigment; a blowing agent; and a filler having a specific graving of between 2 and 4, wherein a sheet formed from the composition has a low Shore A hardness when tested using a Shore A durometer; wherein a pelletized form of the composition has a specific gravity greater than 1, and wherein the composition has a melting point greater than 200° F.

Aspect 77. A synthetic turf field wherein the infield comprises an infill dispersed throughout and wherein the infill comprises a composition comprising: a polyvinyl chloride resin; a plasticizer; a reflective pigment; a blowing agent; and a filler having a specific graving of greater than 2, wherein the composition has a low Shore A hardness when tested using a durometer; wherein the composition has a specific gravity greater than 1, and wherein the composition has a melting point greater than 200° F.

Aspect 78. A composition comprising: a polyvinyl chloride resin; a plasticizer; a reflective pigment; a blowing agent; and a filler having a specific graving of between 2 and 4, wherein a sheet formed from the composition has a low Shore A hardness when tested using a Shore A durometer; wherein a pelletized form of the composition has a specific gravity greater than 1, and wherein the composition has a melting point greater than 200° F.

Aspect 79. The composition of aspect 78, wherein the composition is disposed as an infill for an artificial turf field and wherein the infill maintains the artificial turf field at a temperature that is up to about 40° F. less than the temperature of a comparative artificial turf under substantially similar ambient and environmental conditions, wherein a comparative infill of the comparative artificial turf comprises crumbed rubber infill.

Aspect 80. The composition of aspect 78, wherein the composition is disposed as an infill for an artificial turf field and wherein the infill maintains the artificial turf field at a temperature that is up to about 25° F. less than the temperature of a comparative artificial turf under substantially similar ambient and environmental conditions, wherein a comparative infill of the comparative artificial turf comprises crumbed rubber infill.

Aspect 81. The composition of aspect 78, wherein the composition is disposed as an infill for an artificial turf field and wherein the infill maintains the artificial turf field at a temperature that is about 15° F. to about 25° F. less than the temperature of a comparative artificial turf under substantially similar ambient and environmental conditions, wherein a comparative infill of the comparative artificial turf comprises crumbed rubber infill.

EXAMPLES

The disclosure is illustrated by the following non-limiting examples.

Preparation of disclosed infill:

Formulations were prepared from the components presented in Table 1. Components were combined in an extruder at a temperature sufficient to melt and mix the ingredients. The resulting material was extruded through a die into a rod shape and then cut to pellet size. The pellets can be up to about 5 mm in size as desired.

TABLE 1

Formulation for infill.

| Ingredient | Weight Percent | Supplier |
|---|---|---|
| Polyvinyl chloride (PVC) Resin | 40-60 | Axiall |
| Pigments/Colorants | 2-5 | Ferro |
| Calcium carbonate (inert filler) | 5-30 | Huber |
| Blowing agent (proprietary) | 0.01-0.75 | Dover |
| Corn or soy oil derived plasticizer | 5-30 | Dow |
| Titanium dioxide ($TiO_2$) (reflective pigment) | 2-6 | Dupont |
| Antimony tri-hydroxide (flame retardants) | 1-5 | UMC |
| Benzoin (lubricant) | 0-20 | Lubrizol |
| Tin oxide (heat stabilizer) | 0.5-2.0 | BASF |
| Tinuvin ™ 1010 (UV stabilizer) | 0.25-1.5 | BASF |

Temperature Analysis of Synthetic Turfs:

Multiple synthetic turf carpets were prepared for evaluation using the same synthetic turf carpet with only the infill varied between systems. That is, one sample system comprised samples of synthetic turf carpet having a crumb rubber infill and a second sample system comprised samples of synthetic turf carpet having the disclosed infill. Both sample systems included the infill and turf as well as a silica sand top-dressing/balance. Sample systems were prepared according to EN 12229: Surfaces for sports areas-Procedure for the preparation of synthetic turf and textile pieces. Table 2 describes the composition of the sample systems with respect to the infill type and the silica sand.

TABLE 2

Configuration of Synthetic Turf Sample Systems.

| System | Description of Synthetic Turf Carpet | Infill Combination (by weight) |
|---|---|---|
| Crumb rubber infill (Styrene-butadiene rubber, SBR Rubber/sand) | 2.25" Slit Film; ¾" Pile Exposure | 50% SBR Rubber/50% Silica sand |
| Thermoplastic Elastomer/sand (PVC resin based) | 2.25" Slit Film; ¾" Pile Exposure | 50% PVC resin based/50% silica sand |

Samples were conditioned to room temperature for about 24 hours. The samples were heated for 3.5 hours. Temperature sensors were used to capture and record measurements to a digital data logger 60 second intervals. Thermocouples mounted in series to the samples provided a 2 point average of the surface temperature. Samples may be observed for a pre-determined time period, for example about 4 hours. The hourly average temperature was recorded at each temperature sensor and the average of each temperature sensor was observed. Table 3 presents the system results for the crumb rubber infill (styrene-butadiene rubber/sand) and the thermoplastic elastomer (TPE)/sand infill (disclosed PVC resin based).

TABLE 3

Temperature per time period for system samples.

| | Average Temperature per Time Period Temperature (° F.) per Sensor | | |
|---|---|---|---|
| | Exposure Time Period | Surface Sensor #1 | Surface Sensor #2 |
| Crumb rubber infill (Styrene-butadiene rubber, SBR Rubber/sand) | 0 hr-1 hr | 160.3° F. (71.2° C.) | 163.5° F. (73.1° C.) |
| | 1 hr-2 hr | 182.3° F. (83.5° C.) | 183.4° F. (84.1° C.) |
| | 2 hr-3 hr | 198.6° F. (92.5° C.) | 190.7° F. (88.2° C.) |
| | 3 hr-3.5 hr | 208.2° F. (97.9° C.) | 204.3° F. (95.8° C.) |
| | 0 hr-1 hr | 160.3° F. (71.3° C.) | 163.5° F. (73.1° C.) |

| | Average Temperature per Time Period Temperature (° F.) per Sensor | | |
|---|---|---|---|
| | Exposure Time Period | Surface Sensor #1 | Surface Sensor #2 |
| Thermoplastic Elastomer/sand (PVC resin based) | 0 hr-1 hr | 144.9° F. (62.7° C.) | 158.2° F. (70.1° C.) |
| | 1 hr-2 hr | 167.5° F. (75.3° C.) | 178.7° F. (81.5° C.) |
| | 2 hr-3 hr | 173.3° F. (78.5° C.) | 180.5° F. (82.5° C.) |
| | 3 hr-3.5 hr | 174.6° F. (79.2° C.) | 181.7° F. (83.2° C.) |
| | 0 hr-1 hr | 144.9° F. (62.7° C.) | 158.2° F. (70.1° C.) |

Table 3 combines the average temperatures and provides the difference between each system. FIG. 1 provides a graphical representation of the results.

TABLE 3

Average temperatures and temperature difference.
Average Temperature per Time Period
Temperature (° F.) per Sensor

| Exposure Time Period | SBR Rubber/ Sand | Temp Difference (° F.) | Guardian Innovations TPE/Sand |
|---|---|---|---|
| 0 hr-1 hr | 161.9° F. (72.2° C.) | 10.4° F. | 151.6° F. (66.4° C.) |
| 1 hr-2 hr | 182.9° F. (83.8° C.) | 9.8° F. | 173.1° F. (78.4° C.) |
| 2 hr-3 hr | 194.7° F. (90.4° C.) | 17.8° F. | 176.9° F. (80.5° C.) |
| 3 hr-3.5 hr | 206.3° F. (96.8° C.) | 28.1° F. | 178.2° F. (81.2° C.) |

As shown, the average temperature per time period for the synthetic turf carpet having the disclosed infill dispersed throughout is up to about 30° F. lower than the synthetic turf carpet having the conventional crumb rubber infill dispersed throughout for the corresponding time period. As time passes, the disclosed infill is able to keep the synthetic turf carpet cooler than the crumb rubber infill (consisting essentially of a crumb rubber) dispersed throughout the similar synthetic carpet at constant ambient and environmental conditions.

The example should not be considered to limit the invention to just a blend of these resins. For example, the resins could be used alone or other resins could be used. In addition, the invention could be applied to means of mixing other than extruders. Other plastic mixing machines such as Banbury™ mixers could be used rather than an extruder.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

Unless otherwise stated to the contrary herein, all test standards are the most recent standard in effect at the time of filing this application.

Each of the materials disclosed herein are either commercially available and/or the methods for the production thereof are known to those of skill in the art.

As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

It is to be understood that the present compounds, compositions, articles, systems, devices, and/or methods disclosed and described are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An infill comprising:
   from about 40 wt. % to about 60 wt. % of a polyvinyl chloride resin;
   from about 5 wt. % to about 30 wt. % of a plasticizer;
   from about 2 wt. % to about 10 wt. % of a reflective pigment;
   from about 0.01 wt. % to about 0.1 wt. % of a blowing agent; and
   from about 5 wt. % to about 30 wt. % of a filler, wherein the filler is calcium sulfate, calcium carbonate, a silica powder, or a combination thereof, and wherein the filler has a specific gravity of greater than 2,
   wherein the infill has a melting point greater than 200° F.,
   wherein the infill is pelletized and exhibits a specific gravity greater than 1, and
   wherein the pelletized infill maintains the temperature of an artificial turf field, when disposed throughout the artificial turf field, at a temperature about 15° F. to about 25° F. less than a temperature of a comparative artificial turf under substantially similar ambient and environmental conditions, wherein a comparative infill of the comparative artificial turf consists essentially of crumbed rubber infill.

2. The infill of claim 1, wherein the plasticizer is a phthalate, a trimellitate, an adipic polyester, or mixtures thereof.

3. The infill of claim 1, wherein the reflective pigment is an infrared reflective pigment.

4. The infill of claim 1, wherein the infill comprises from about 10 wt. % to about 40 wt. % air or trapped gasses.

5. The infill of claim 1, wherein the infill comprises about 2 wt. % to about 8 wt. % of the reflective pigment.

6. The infill of claim 1, wherein the infill comprises from about 2 wt. % to about 5 wt. % of the reflective pigment.

7. The infill of claim 1, wherein the infill comprises from about 0.05 wt. % to about 0.25 wt. % of the blowing agent.

8. The infill of claim 1, wherein the reflective pigment comprises titanium dioxide.

9. The infill of claim 1, wherein the filler has a specific gravity between 2 and 4.

10. The infill of claim 1, wherein the filler comprises calcium sulfate.

11. The infill of claim 1, wherein the filler comprises calcium carbonate.

12. The infill of claim 1, wherein the infill has a melting temperature greater than about 300° F.

13. The infill of claim 2, wherein the plasticizer is a selected from the group consisting of di-isononyl phthalate, diallyl phthalate, di-2-ethylhexyl-phthalate, dioctyl phthalate, di-isodecyl phthalate, and mixtures thereof.

14. The infill of claim 2, wherein the plasticizer is di-isononyl phthalate.

15. The infill of claim 2, wherein the plasticizer is a trimellitate.

16. The infill of claim 2, wherein the plasticizer is an adipic polyester.

* * * * *